Nov. 4, 1969    F. R. GRUNER    3,476,340
MOUNTING ARRANGEMENT FOR LAUNDRY MACHINES
Filed Oct. 6, 1967
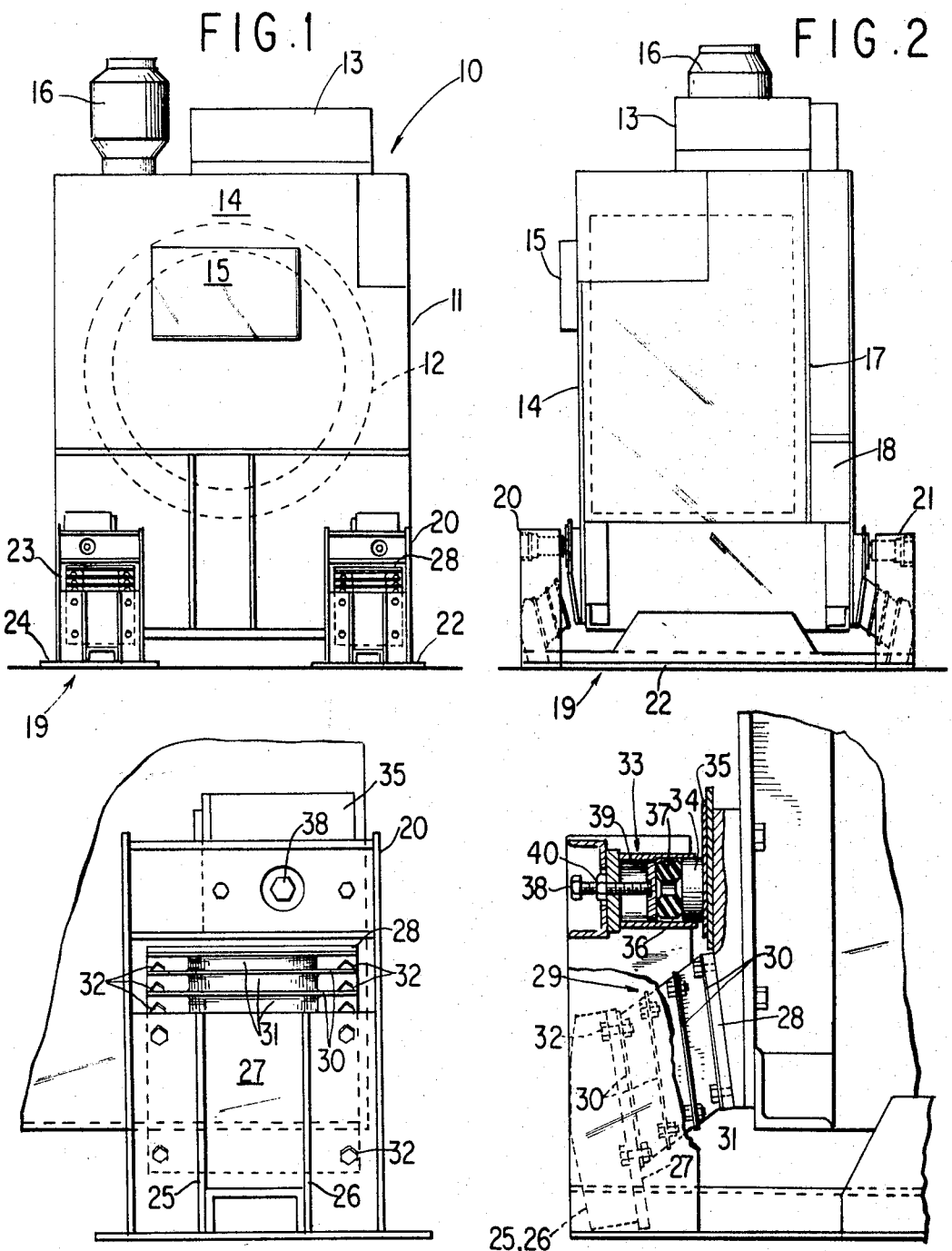
INVENTOR
Frederick R. Gruner
BY
Smythe & Moore
ATTORNEYS

United States Patent Office 3,476,340
Patented Nov. 4, 1969

3,476,340
MOUNTING ARRANGEMENT FOR
LAUNDRY MACHINES
Frederick R. Gruner, Moline, Ill., assignor to Ametek,
Inc., New York, N.Y., a corporation of Delaware
Filed Oct. 6, 1967, Ser. No. 673,354
Int. Cl. E02d 27/44; F16m 1/00; F16f 15/04
U.S. Cl. 248—22                                    1 Claim

ABSTRACT OF THE DISCLOSURE

A vibration isolation mount for a laundry machine with a shear type rubber mounting positioned between the base and the housing of the machine and shear planes of the mount being in a plane which is inclined to the vertical axis of the housing.

---

The present invention relates to a vibration isolation mount for laundry machines, more particularly, in the arrangement of a shear type rubber mounting between the base and housing of a laundry machine.

One form of a laundry machine is the washer-extractor which may comprise a drum rotating about a horizontal axis. When such laundry machines, particularly of a commercial size, are mounted on the floors of a building substantially above ground level, it is generally intended that the building floor must absorb the vibrations resulting from unbalanced loads within the machine. Accordingly, many mounting structures have been devised in order to absorb the vibrations originating within the housing of the machine. Such vibration isolation mounts are generally positioned between the base and housing of the machine and usually comprise some form of a resilient mounting. Considerable difficulties have been encountered in devising such vibration isolalation mounts which will satisfactorily absorb low frequency vibration while, at the same time, have a relatively long operating life.

It is therefore an object of the present invention to provide a novel and improved vibration isolation mount for a laundry machine.

It is another object of the present invention to provide a vibration isolation mount which will absorb low frequency vibrations and have a long operating life.

It is a further object of the present invention to provide a heavy-duty vibration isolation mount which is simple to manufacture and install and will be free of failures during operation.

While not limited thereto, the present invention may be effectively employed in a laundry machine, such as a washer-extractor, having a structural base along opposed side walls of the housing. In one aspect of the present invention there may be provided mounting face means on the base in a plane inclined with respect to the vertical axis of the housing. An inclined mounting plate is provided on the housing so as to be laterally aligned with the mounting face means and parallel therewith. The mounting plate is positioned somewhat higher than the mounting face means. A shear type rubber mounting is interposed between the mounting face means and the mounting plate so that the shear planes thereof are parallel to the inclined mounting plate and mounting face means. A resiliently mounted shoe means is positioned between the base and the housing to provide a frictional resistance within a plane parallel to the vertical axis of the housing. The mounting face means and mounting plate are so inclined that their upper portions are tilted outwardly from the vertical axis of the housing.

Other objects and advantages of the present invention will be apparent upon reference to the accompanying description when taken in conjunction with the following drawings, which are examplary, wherein;

FIG. 1 is a front elevational view of a laundry machine incorporating the vibration isolation mount of the present invention;

FIG. 2 is a side elevational view of the laundry machine shown in FIG. 1;

FIG. 3 is an elevational view in enlarged scale of the vibration isolation mount shown on the laundry machine in FIG. 1; and FIG. 4 is a side elevational view in enlarged scale of the vibration mount as shown in FIG. 3.

Proceeding next to the drawings wherein like reference symbols indicate the same parts throughout the various views a specific embodiment of the present invention will be disclosed in detail.

As may be seen in FIG. 1 there is illustrated a washer-extractor indicated generally at 10 and comprising a housing 11 in which is mounted a drum or basket 12 for rotation about a horizontal axis. The basket 12 is drivingly connected by a gear chain or belt to a driving motor 13. The front wall 14 of the housing is provided with an access door 15 through which the basket 12 may be loaded or unloaded. A fan 16 may be mounted on top of the housing for withdrawing vapor therefrom. A rear wall 17 of the housing may be provided with reinforcing web means 18.

A structural base frame work indicated generally at 19 is provided and may comprise standards 20 and 21 adjacent the front and rear walls of the housing and interconnected by a structural steel member 22 along the side wall of the housing. Similarly, a standard 23 positioned adjacent the front wall of the housing is connected by a structural steel member 24 with a similar standard adjacent the rear wall of the housing but not shown in the drawing.

As may be more clearly seen in FIGS. 3 and 4 a standard, such as 20, may comprise a pair of angle members 25 and 26 inclined at an angle to the vertical axis of the housing as shown in FIG. 4. The inner faces of these angle members are in the same inclined plane as indicated at 27 and define mounting face means for the vibration isolation mount of the present invention.

A mounting plate 28 is fastened to a wall of the housing and is inclined at an angle so as to be parallel to the mounting face means 27. The mounting plate 28 is laterally aligned with the mounting face means as may be seen in FIGS. 1 and 3 but is positioned somewhat higher as will be evident in FIG. 4. Located between the mounting face means 27 and mounting plate 28 is a shear type rubber mounting member 29 which may comprise parallel spaced metallic plates 30 between which are bonded rubber bodies 31. Although one or more of the shear type rubber mountings may be employed in the present embodiment three such mountings are shown in series relation. The metallic plates 30 of each mounting extend beyond the limits of the rubber body 31 so as to provide a margin therearound through which are passed bolts 32.

It will be noted from FIG. 4 of the drawings that the metal plates 30 are displaced so that they remain in parallel relation but are out of alignment with the rubber bodies being vulcanized or otherwise adhered thereto. Thus, when all of the vibration isolation mounts according to the present invention are assembled and mounted in the machine to support the housing in the normal or no-load condition, the position of the rubber blocks and the interspersed plates will be as illustrated in FIGS. 2 and 4. Additionally, during assembly, the shear mountings may be so positioned that the rubber is placed slightly in compression to prevent any failures in the bond of the rubber to the metal plates.

The mount arrangement as described above for one corner of the machine is similar to the mounts at each corner of the housing 11.

Each of the standards 20, 21 and 23 extend above the shear type rubber mountings 29 and has attached thereto a cylinder 33 adapted loosely to receive a piston 34 preferably made of a friction material. A friction plate 35, preferably of stainless steel may be welded or otherwise fastened to the housing walls 14 and 17. The piston 33 includes a chamber 36 for receiving a compression member 37. An adjusting screw 38 acts upon the end of member 39 and a locking nut 40 is provided for locking the screws in adjusted position to provide a predetermined resilient force acting to hold piston 34 in frictional contact with plate 35. There may be identical friction producing means at each corner of the housing 11 above the corresponding shear type rubber mounting.

During normal operation of the machine, the friction force generated on the surfaces 34 and 35 will oppose the motion of the housing and will thereby prevent excessive amplitudes of motion.

Thus it can be seen that the present invention has disclosed a vibration isolation mount with the mounting faces of the mount being inclined at an angle with respect to the vertical axis of the housing of the laundry machines. The result is a considerably more effective mount which efficiently absorbs vibrations and prevents the transmittal of such vibrations to the surface upon which the machine is mounted.

What is claimed is:

1. In a laundry machine including a housing, a basket mounted in said housing for rotation about a horizontal axis, a structural base framework along opposed side walls of said housing, vertical standards adjacent the corners of said housing, a vibration isolation mount comprising upwardly and outwardly extending mounting face means on said standards and inclined with respect to the axis of rotation of said basket, similarly inclined mounting plate means on said housing laterally aligned with and positioned above said mounting face means and parallel therewith, shear type rubber mountings between said mounting faces and plates so that the shear planes thereof are parallel to said inclined plate and face means and are inclined at an angle to the vertical axis of the housing, and resiliently mounted shoe means between said standards and said housing to provide a frictional resistance within a plane parallel to the vertical axis of the housing.

References Cited

UNITED STATES PATENTS

| | | | |
|---|---|---|---|
| 2,410,749 | 11/1946 | Robinson | 248—22 X |
| 2,655,005 | 10/1953 | Kinneman. | |
| 2,685,425 | 8/1954 | Wallerstein | 248—358 |
| 2,828,957 | 4/1958 | Hirst | 267—3 |
| 2,883,130 | 4/1959 | Rose | 248—22 |
| 3,167,508 | 1/1965 | Gruner | 210—250 |
| 3,200,950 | 8/1965 | Gruner | 210—364 |

ROY D. FRAZIER, Primary Examiner

J. FRANKLIN FOSS, Assistant Examiner

U.S. Cl. X.R.

210—364; 248—15, 358; 267—1